United States Patent Office 3,352,820
Patented Nov. 14, 1967

3,352,820
ABS POLYMERS STABILIZED WITH A METAL SULFIDE AND ONE OR MORE PHENOLIC, AMINE OR PHOSPHITE ANTIOXIDANTS
Carl V. Bawn, Naugatuck, Conn., assignor to United States Rubber Company, New York, N.Y., a corporation of New Jersey
No Drawing. Filed Oct. 31, 1962, Ser. No. 234,561
13 Claims. (Cl. 260—45.75)

This invention relates to novel stabilized ABS polymer compositions and to a method for preparing such compositions. More particularly, this invention relates to an ABS polymer composition stabilized with a metal sulfide wherein the metal is from Group II of the Periodic Table.

The thermoplastic materials to which the present invention pertains are the so called "gum plastics," such as are obtained by grafting resin-forming monomers, e.g., styrene, acrylonitrile, or the like, onto rubbers such as polybutadiene, butadiene-styrene copolymer, or the like, or by mixing a resin, e.g., styrene-acrylonitrile resin, and a rubber, butadiene-acrylonitrile rubber. A specific example is the family commonly referred to as "ABS Plastics," meaning that they are comprised of acrylonitrile, butadiene, and styrene.

While ABS plastics have received considerable attention of late and have been widely used, heretofore such plastics have exhibited a tendency to discolor when subjected to a temperature sufficiently high to flux the plastic, and this has been so even when a conventional antioxidant or mixture of antioxidants has been present. Particularly severe discolorations have occurred when the plastic has been subjected to a temperature in excess of about 300° F. in the presence of air. Moreover, with prolonged exposure under such conditions, there will occur, in addition to discoloration, a degradation of the physical properties of the plastic. In the fabrication of various products from ABS plastics it has been necessary to heat the material above its fluxing point in order to form it. However, such heating invariably results in objectionable discoloration, even when pigments are added to the composition to mask the discoloration.

Accordingly, it is an object of this invention to provide a novel method for stabilizing ABS plastic compositions.

Another object is to provide a method for stabilizing an ABS plastic composition so that such composition will not discolor when subjected to elevated temperatures in the presence of air.

A further object is to provide a novel stabilized ABS plastic composition.

Additional objects will become apparent hereinafter.

In accordance with one aspect of my invention, I have found that an ABS plastic composition which contains a conventional antioxidant or mixture of antioxidants can be effectively stabilized against discoloration and degradation of physical properties from elevated temperature aging. Such stabilization is effected by incorporating into the plastic a small but effective amount of a sulfide of certain of the metals selected from Group II of the Periodic Table, i.e., a sulfide of beryllium, magnesium, calcium, zinc, strontium, cadmium, or barium. Preferred metal sulfide stabilizers to be used in accordance with my invention constitute zinc sulfide, barium sulfide, and calcium sulfide, with particular preference being accorded zinc sulfide. A mixture containing a Group II metal sulfide may also be used, e.g., lithopone (a mixture of barium sulfate and zinc sulfide).

As previously pointed out, an ABS polymeric material contains acrylonitrile, butadiene and styrene. Such ABS polymeric material will generally contain from about 5 to 35% acrylonitrile, about 5 to 35% butadiene, and about 40 to 90% styrene, based on the entire ABS polymer as 100%.

The ABS polymer may be what is known as a graft copolymer, which may be prepared in accordance with known practice by polymerizing acrylonitrile monomer and styrene monomer in a previously prepared polybutadiene latex (or butadiene copolymer rubber latex), under such conditions that an appreciable portion of the acrylonitriles and styrene become "grafted," or polymerized directly on, the polybutadiene molecules, to make a new polymeric material which is commonly referred to as an ABS polymer. The butadiene portion, (sometime called the "base" or "spine") of the ABS graft polymer molecule is rubbery while the acrylonitrile-styrene (the grafted comonomers) portion of the graft polymer molecule is resinous. In practice, it is frequently desirable to add to such graft copolymer an additional quantity of separately prepared resin, e.g., styrene-acrylonitrile resin, with or without additional separately prepared butadiene-acrylonitrile copolymer rubber. A convenient way of blending these various polymeric materials is to blend or mix them in latex form, and thereafter coprecipitate or coagulate them to yield the desired mixture. However, the polymeric material may also be blended in solid form if desired.

Of course, other methods may be employed to produce the graft copolymer. For example, a suspension technique may be utilized wherein the rubber polymer or copolymer is dissolved in a mixture of the monomers acrylonitrile and styrene. The resulting solution is then suspended as particles in water and the particles are polymerized as beads. Alternatively, solution polymerization can be effected wherein the rubber and monomers are dissolved in a suitable solvent and then polymerized. Mass or bulk polymerization is also suitable, e.g., by adding the rubber and monomers to a reactor having a high heat transfer surface such as an extruder and then polymerizing.

In place of some or all of the graft copolymer, one may employ, as the ABS polymer, a physical blend (as distinguished from a chemically united graft copolymer) of separately prepared acrylonitrile-styrene resin and butadiene-acrylonitrile rubber, in such proportions as to yield the desired overall percentages of acrylonitrile, butadiene, and styrene previously specified.

Typical of the graft copolymers referred to previously are those described in U.S. Patent No. 2,820,773 to Childers et al., which issued Jan. 2, 1958. Typical of gum plastics in the form of actual physical blends of rubber and resin are those described in U.S. Patents 2,439,202 to Daly, which issued Apr. 6, 1948, and 2,600,024 to Romeyn et al., which issued June 10, 1952.

As previously noted, my invention involves adding to an ABS polymer, i.e., a graft copolymer of styrene and acrylonitrile onto polybutadiene rubber (with or without mixing therewith a separately prepared resinous material such as a copolymer of styrene and acrylonitrile), or a physical blend of a resin such as styrene-acrylonitrile resin and a rubber such as butadiene-acrylonitrile rubber, in the presence of a conventional stabilizer, a small but effective amount of stabilizer which comprises a sulfide of a metal selected from Group II of the Periodic Table. I have found that effective stabilizing action against discoloration and degradation of physical properties can be secured by the addition, in the presence of a conventional stabilizer, of from as little as 0.1 up to as much as about 15 parts of certain Group II metal sulfides per 100 parts by weight of ABS polymer. A more preferred range is from about 0.25 to 1.0 part of metal sulfide stabilizer per 100 parts of ABS polymer.

The actual point at which the metal sulfide stabilizer is added is not critical; that is, the benefits of my invention are obtained whether the stabilizer is added during the actual course of polymerization, or is added subsequently during the compounding operations. Of course, other desired appropriate ingredients, e.g., pigments, fillers and the like, may be included in the composition in conventional manner.

By the expression "conventional stabilizer" is meant such stabilizers as phosphites, phenolics, amines, and the like. Typical phosphite stabilizers include tris (mixed nonyl phenyl) phosphite, triphenyl phosphite, trioctyl phosphite, tri (4-methyl-2,6-ditertiary butyl phenyl) phosphite, phenyl di (octyl phenyl) phosphite, octyl di (octyl phenyl) phosphite, tri [4-methyl-2,6-di (α-methyl-benzyl)] phosphite, etc. Typical phenolic stabilizers include 2,4-methylene bis (4-methyl-6-nonyl phenol), 2,6-ditertiary butyl-p-cresol, 4-methyl-2,6-ditertiary butyl phenol, 4-methyl-2-nonyl phenol, 2,2'-methylene bis (4-methyl-6-tertiary butyl phenol), 2,6-di (α-methyl benzyl)-4-cresol, etc. Typical amines includes p,p'-dioctyl diphenyl amine, diheptyl diphenyl amine, styrenated diphenyl amine, dinonyl diphenyl amine, N,N'-diphenyl-p-phenyl diamine, N,N'-dioctyl-p-phenylene diamine, N-isopropyl-N'-phenyl-p-phenylene diamine, N-phenyl-N-B-naphthyl-p-phenylene diamine, etc.

Generally, it is preferred that the amount of conventional stabilizer employed along with one or more of the metal sulfides of my invention be from about 0.1 to 5 parts per 100 parts by weight of ABS polymer. If a phosphite type of stabilizer is employed, the preferred range is from about 0.5 to 5 parts per 100 parts of polymer; if either a phenolic type or amine type of stabilizer is used, then the preferred range is from about 0.1 to 1 part. Of course, where combinations of the foregoing conventional stabilizers are employed (along with one or more of the metal sulfides of my invention), then the ranges of each are adjusted accordingly.

The following examples will further illustrate my invention. All parts are by weight unless otherwise indicated.

*Preparation of graft copolymer*

A graft copolymer of 32 parts of styrene and 18 parts of acrylonitrile polymerized on 50 parts of polybutadiene rubber was prepared, using the following recipe:

Ingredients: Parts
  Water ------------------------------------ 250
  Polybutadiene latex (emulsified with soap and catalyzed with potassium persulfate; parts expressed on the basis of actual rubber solids) -------------------------------- 49.6
  Styrene ---------------------------------- 32
  Acrylonitrile ---------------------------- 18.4
  Tertiary octyl mercaptan ----------------- 0.3
  Potassium persulfate --------------------- 0.43

The above graft copolymer will be referred to hereinafter as Graft "G."

*Preparation of mixtures of graft copolymer (G) and resin (R)*

The following materials were blended as latices, then coagulated with 1% acetic acid at a temperature in excess of 80° C., filtered, reslurried in water to remove water-soluble components, again filtered, and then dried at temperatures in excess of 60° C. The resultant graft-resin mixtures are identified as G-R-I, G-R-II, and G-R-III.

| Ingredients | G-R-I | G-R-II | G-R-III |
| --- | --- | --- | --- |
| Graft, G | 65 | 55 | 35 |
| 72% styrene-28% acrylonitrile copolymer | 35 | 45 | 65 |
| Antioxidants (emulsified): | | | |
| Tri(nonylphenyl) phosphite ("Polygard") | 3.0 | 3.0 | 3.0 |
| 2,2-methylenebis (4-methyl-6-nonylphenol) ("Nauga-white") | 0.125 | 0.125 | 0.125 |

The foregoing graft-resin mixtures are also tabulated below in terms of amounts of polybutadiene (from the Graft G) and styrene-acrylonitrile resin (including styrene and acrylonitrile from both the Graft G and from the Resin R):

| Ingredients | G-R-I | G-R-II | G-R-III |
| --- | --- | --- | --- |
| Polybutadiene | 32.5 | 27.5 | 17.5 |
| Styrene-acrylonitrile resin | 67.5 | 72.5 | 82.5 |
| Tri(nonylphenyl) phosphite | 3.0 | 3.0 | 3.0 |
| 2,2-methylenebis (4-methyl-6-nonylphenol) | 0.125 | 0.125 | 0.125 |

*Preparation of a physical blend of rubber (R) and resin (R)*

A rubber-resin physical blend was prepared by latex blending a rubbery butadiene-acrylonitrile copolymer (67% butadiene, 33% acrylonitrile) with a styrene-acrylonitrile resin (72% styrene, 28% acrylonitrile) along with antioxidants. Calcium chloride was used as the coagulant. In this manner the following rubber-resin blend (R-R) was prepared:

Ingredients: R-R
  Rubber (prepared by emulsion polymerization; parts based on rubber solids) ------------ 33
  Styrene-acrylonitrile resin ------------------ 67
  Antioxidants:
    Ditertiarybutyl paracresol ("Deenax") --- 0.45
    Mixed mono- and dioctyldiphenylamine ("Agerite Stalite") ------------------ 0.20

*Incorporation of Group II metal sulfide stabilizer*

The incorporation of the stabilizer is carried out by any one of several methods:

A. MILL BLENDING

Appropriate amounts of ABS polymer, Group II metal sulfide stabilizer, and such other ingredients as lubricants, pigments, and the like are fluxed on a standard two roll rubber mill with the rolls maintained at a temperature of from about 320 to 350° F. After mixing for about 10 minutes the material is removed from the mill as a sheet.

B. BANBURY MIXING

ABS polymer, metal sulfide stabilizer, lubricants, pigments, and the like are charged to a Banbury mixer and are mixed for from about three to ten minutes at a temperature of from about 350 to 450° F. The stock is then dumped onto a hot mill and is then removed as a sheet.

C. DISPERSION (1) A dispersion of the metal sulfide stabilizer is added to a latex blend prior to coagulation.
(2) A metal sulfide dispersion or a solution capable of precipitating the metal sulfide, e.g., a metal acetate such as zinc acetate and sodium sulfide solution capable of precipitating the metal sulfide in situ, is added to the resin polymerization recipe prior to actual polymerization. The resin is then polymerized and the resulting resin latex is blended with other latices and antioxidants, then coagulated, etc.

In the following specific examples, using a graft-resin mixture (G-R) or a rubber-resin mixture (R-R) as previously described, the efficacy of the Group II metal sulfide stabilizers of my invention is demonstrated. An arbitrary scale of discoloration was established, with 13 being indicative of the least discoloration and 1 being indicative of the greatest discoloration.

EXAMPLE I

Five separate mixtures were prepared, each of which contained 100 parts of Graft-Resin Mixture-I (G-R-I) and one part of stabilizing material. Each such mixture was mixed in a Banbury for six minutes with a peak temperature of 410° F., was then milled for 30 minutes at a stock temperature of 360° F., and was then removed from the mill as a thin sheet. A portion of each such sheet was oven aged at 350° F. for one hour. The various stabilizer and the relative discoloration ratings are tabulated below:

| Stabilizer: | Discoloration rating |
|---|---|
| Zinc stearate | 5 |
| Zinc oxide | 7 |
| Lithopone (mixture of 75% barium sulfate and 25% zinc sulfide) | 10 |
| Zinc sulfide | 12 |
| Stearic acid | 2 |

It will be seen that lithopone, containing 25% zinc sulfide, and zinc sulfide per se exhibited far greater stabilizing action than any of the other stabilizers.

EXAMPLE II

Samples of Graft-Resin Mixture–II (G-R–II) and Graft-Resin Mixture–III (G-R–III) were each mill blended with lubricants, and either with zinc sulfide or with titanium dioxide, or with both, to produce equivalent pigmentation, for ten minutes, and thereafter were sheeted off the mill, granulated, and then injection molded. Exposure of the molded pieces in an oven at a temperature of 350° F. for 4.5 hours produced the following results:

| Ingredients | A | B | C | D | E | F |
|---|---|---|---|---|---|---|
| G-R-III | 100 | 100 | 100 | | | |
| G-R-II | | | | 100 | 100 | 100 |
| Zinc Stearate Lubricant | 3 | 3 | 3 | 3 | 3 | 3 |
| Zinc sulfide | | 0.25 | 1.0 | | 0.25 | 1.0 |
| Titanium dioxide | 1.0 | 0.75 | | 1.0 | 0.75 | |
| Discoloration Rating | 7 | 12 | 11 | 5 | 11 | 10 |

From the foregoing data it is clear that stocks B, C, E and F, each of which contained zinc sulfide, were effectively stabilized, whereas with stocks A and D the stabilization was considerably less effective.

EXAMPLE III

Samples of Rubber-Resin (R-R) were mill blended with zinc sulfide and titanium pigment for five minutes, and were then sheeted off. Portions of the sheets were oven aged for one half an hour at 400° F., to thereby obtain the following results:

| Ingredients | G | H | J |
|---|---|---|---|
| R-R | 100 | 100 | 100 |
| Zinc Sulfide | | 0.25 | 1.0 |
| Titanium dioxide | 5.0 | 4.75 | 4.0 |
| Discoloration Rating | 6 | 10 | 12 |

Stocks H and J, each of which container zinc sulfide, were far better stabilizers than the "control" stock G.

EXAMPLE IV

This example shows that the metal sulfide stabilizer does not deleteriously affect either the appearance or the physical properties of the gum plastic. Samples of Graft-Resin-Mixture–II (G-R–II) were treated as described in Example II and the physical properties were measured and are tabulated below:

| | K | L | M |
|---|---|---|---|
| Ingredients: | | | |
| G-R-II | 100 | 100 | 100 |
| Zinc Stearate Lubricant | 3 | 3 | 3 |
| Zinc Sulfide | | 0.25 | 1.0 |
| Titanium dioxide | 1 | 0.75 | |
| Properties: | | | |
| Rockwell R hardness | 101 | 99 | 101 |
| Notched Izod impact at room temperature (¼ inch bar) | 4.0 | 4.8 | 4.8 |

The foregoing data clearly indicates that the presence of the metal stabilizers of my invention do not adversely affect the physical properties of the gum plastic.

EXAMPLE V

This example illustrates the fact that the Group II metal sulfide stabilizers can be added at virtually any time. Either zinc sulfide or zinc oxide was added to the following recipe prior to polymerization:

| Ingredients: | Parts |
|---|---|
| Water | 300 |
| Styrene | 70 |
| Acrylonitrile | 30 |
| Dresinate 731 (sodium salt of a disproportionated rosin acid) | 2.0 |
| Sodium hydroxide | 0.06 |
| Potassium persulfate | 0.3 |
| Mixed tertiary mercaptans | 0.3 |

The resultant latex was blended with graft copolymer latex G to produce Graft-Resin-Mixture–I (G-R–I). This was coagulated, dried, and mill-blended with 5 parts TiO$_2$ and sheeted off. Portions of these sheets were aged one hour at 350° F. The amounts of zinc sulfide or zinc oxide charged during polymerization and the discolorations are tabulated below:

| Ingredients | N | O | P | Q | R | S | T | U | V |
|---|---|---|---|---|---|---|---|---|---|
| Zinc sulfide | | 0.25 | 0.5 | 1.0 | 2.0 | | | | |
| Zinc oxide | | | | | | 0.1 | 0.5 | 0.1 | 2.0 |
| Discoloration rating | 9 | 12 | 13 | 13 | 13 | 9 | 9 | 9 | 9 |

Clearly, the action of zinc sulfide is superior to that of zinc oxide, which is no better than the control, stock N.

EXAMPLE VI

This example illustrates the suitability of various other Group II metal sulfides as stabilizers. Using Graft-Resin-Mixture–I (G-R–I) the following data was obtained:

| Ingredients | W | X | Y |
|---|---|---|---|
| G-R-I | 100 | 100 | 100 |
| Zinc Sulfide | 0.25 | | |
| Barium sulfide | | 0.25 | |
| Calcium sulfide | | | 0.25 |
| Discoloration rating (after one hour at 350° F.) | 11 | 10 | 10 |

From the foregoing it will be seen that other Group II metal sulfides, e.g., barium sulfide and calcium sulfide, are also quite effective as stabilizers for gum plastics.

Variations can of course be made without departing from the spirit of my invention.

Having thus described my invention, what I desire to secure and claim by Letters Patent is:

1. A gum plastic composition stabilized against discoloration and thermal degradation, this composition comprising an acrylonitrile-butadiene-styrene polymeric material, effective amounts of a phenolic antioxidant and an antioxidant selected from the group consisting of organic phosphites and organic amines, and a stabilizing amount of a sulfide of a metal selected from the group consisting of zinc, calcium, barium, beryllium, magnesium, strontium and cadmium.

2. The product of claim 1 wherein the amount of metal sulfide is from about 0.1 to 15 parts per 100 parts of acrylonitrile-butadiene-styrene polymeric material.

3. The product of claim 2 wherein the amount of metal sulfide is from about 0.25 to 1.0 part per 100 parts of acrylonitrile-butadiene-styrene polymeric material.

4. The product of claim 1 wherein said metal sulfide is zinc sulfide.

5. The product of claim 1 wherein said metal sulfide is calcium sulfide.

6. The product of claim 1 wherein said metal sulfide is barium sulfide.

7. The composition of claim 1, in which said phenolic antioxidant is selected from the group consisting of 2,4-methylene bis(4-methyl-6-nonyl phenol), 2,6-ditertiary butyl-p-cresol, 4-methyl-2,6-ditertiary butyl phenol, 4-methyl-2-nonyl phenol, 2,2'-methylene bis(4-methyl-6-tertiary butyl phenol), and 2,6-di(alpha-methyl benzyl)-4-cresol.

8. A gum plastic composition stabilized against discoloration and thermal degradation, this composition comprising an acrylonitrile-butadiene-styrene polymeric material, effective amounts of a phenolic antioxidant and an organic phosphite antioxidant, and a stabilizing amount of a sulfide of a metal selected from the group consisting of zinc, calcium, barium, beryllium, magnesium, strontium, and cadmium.

9. The composition of claim 8, in which said organic phosphite antioxidant is selected from the group consisting of tris (mixed nonyl phenyl) phosphite, triphenyl phosphite, trioctyl phosphite, tri(4-methyl-2,6-ditertiary butyl phenyl) phosphite, phenyl di(octyl phenyl) phosphite, octyl di(octyl phenyl) phosphite, and tri[4-methyl-2,6-di(alpha-methyl benzyl)] phosphite.

10. The composition of claim 8 in which said phenolic antioxidant is 2,2-methylenebis (4-methyl-6-nonyl-phenol) and said organic phosphite antioxidant is tri (nonyl phenyl) phosphite.

11. A gum plastic composition stabilized against discoloration and thermal degradation, this composition comprising an acrylonitrile-butadiene-styrene polymeric material, effective amounts of a phenolic antioxidant and an organic amine antioxidant, and a stabilizing amount of a sulfide of a metal selected from the group consisting of zinc, calcium, barium, beryllium, magnesium, strontium, and cadmium.

12. The composition of claim 11, in which said organic amine antioxidant is selected from the group consisting of p,p'-dioctyl diphenyl amine, diheptyl diphenyl amine, styrenated diphenyl amine, dinonyl diphenyl amine, N,N'-diphenyl-p-phenylene diamine, N,N'-dioctyl-p-phenylene diamine, N-isopropyl-N'-phenyl-p-phenylene diamine, N-phenyl-N-beta-naphthyl-p-phenylene diamine, and mixed mono- and dioctyl diphenyl amine.

13. The composition of claim 11, in which said phenolic antioxidant is di-tert.-butyl p-cresol and said organic amine antioxidant is mixed mono- and dioctyl diphenyl amine.

References Cited

UNITED STATES PATENTS

| | | | |
|---|---|---|---|
| 2,599,544 | 6/1952 | Crouch et al. | 260—45.75 |
| 2,985,620 | 5/1961 | Horn | 260—45.75 |
| 3,014,954 | 12/1961 | Birum | 260—45.7 |
| 3,014,956 | 12/1961 | Birum | 260—45.85 |
| 3,029,224 | 4/1962 | Fisher et al. | 260—45.75 |
| 3,058,141 | 10/1962 | Birum | 260—45.75 |
| 3,079,366 | 2/1963 | Boyle et al. | 260—45.85 |
| 3,116,305 | 12/1963 | Morris et al | 260—45.85 |
| 3,153,098 | 10/1964 | Boag | 260—45.95 |
| 3,155,704 | 11/1964 | Knapp | 260—45.95 |
| 3,179,701 | 3/1965 | Rocklin | 260—45.75 |

FOREIGN PATENTS 579,065 7/1958 Italy.

DONALD E. CZAJA, *Primary Examiner.*

LEON J. BERCOVITZ, *Examiner.*

G. W. RAUCHFUSS, *Assistant Examiner.*